(No Model.)
A. G. & E. J. KYLE.
MEAT CLAMP.
No. 506,702. Patented Oct. 17, 1893.
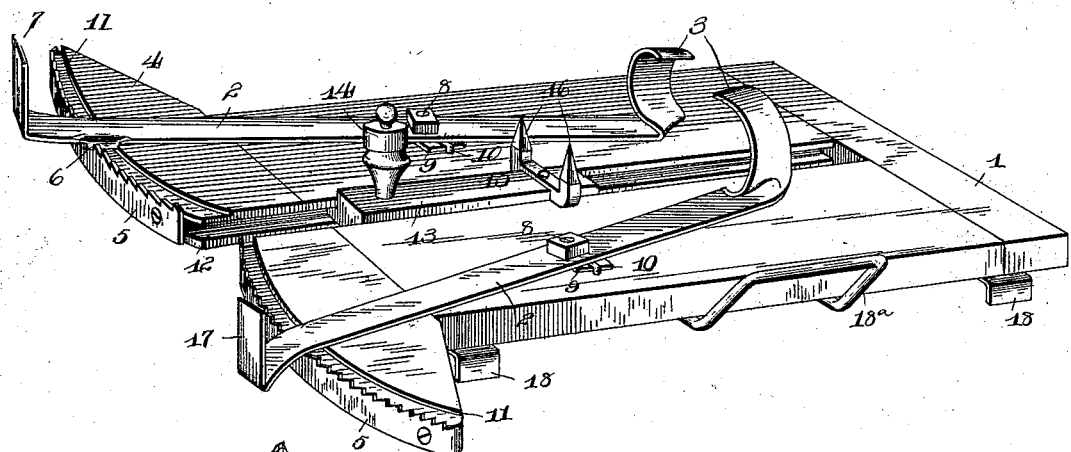
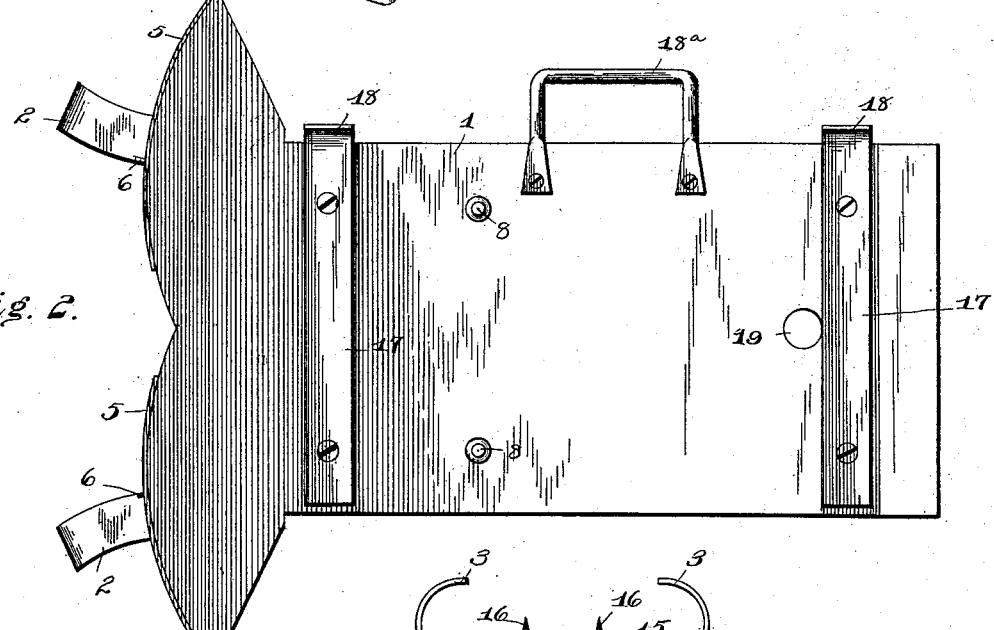
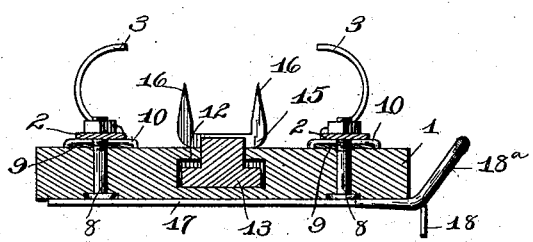
Witnesses
Inventors
Augustus G. Kyle.
and Edward J. Kyle.
By their Attorneys,

UNITED STATES PATENT OFFICE.

AUGUSTUS G. KYLE AND EDWARD J. KYLE, OF NEWVILLE, PENNSYLVANIA.

MEAT-CLAMP.

SPECIFICATION forming part of Letters Patent No. 506,702, dated October 17, 1893.

Application filed November 16, 1892. Serial No. 452,188. (No model.)

*To all whom it may concern:*

Be it known that we, AUGUSTUS G. KYLE and EDWARD J. KYLE, citizens of the United States, residing at Newville, in the county of Cumberland and State of Pennsylvania, have invented a new and useful Meat-Clamp, of which the following is a specification.

The invention relates to improvements in meat clamps.

The object of the present invention is to simplify and improve the construction of meat clamps and to provide one adapted to securely hold a ham or other piece of meat and capable of ready adjustment to permit the meat to be advanced as it is used in cutting, and to conform to the tapering shape of a ham.

The invention consists in the construction and novel combination and arrangement of parts hereinafter fully described, illustrated in the accompanying drawings, and pointed out in the claims hereto appended.

In the drawings—Figure 1 is a perspective view of a meat clamp constructed in accordance with this invention. Fig. 2 is a reverse plan view. Fig. 3 is a transverse sectional view.

Like numerals of reference indicate corresponding parts in all the figures of the drawings.

1 designates a meat-board having fulcrumed near its center oppositely disposed clamping levers 2 which are provided at their front ends with vertically disposed jaws 3 adapted to clamp and to conform to the configuration of the sides of a ham, whereby the latter is securely held on the meat board in position for cutting. The rear end 4 of the meat board is laterally enlarged and the rear edge thereof is similarly convexly curved on opposite sides of the middle of the board and has secured to it curved ratchet bars 5, which are engaged by a depending tooth 6 of each of the levers 2, and which have their teeth at their upper edges. The rear ends of the levers are upturned to form handles 7 which enable the levers to be readily adjusted. The levers are fulcrumed by bolts 8 and are arranged on bearing plates 9 on the upper face of each of which in advance of the bolt is arranged a transverse fulcrum piece 10 which throws the front portion of the lever sufficiently upward to depress the rear end of the lever to cause the tooth 6 to engage the teeth of the ratchet bar, and the upper face of the rear end of the meat board is provided with curved rabbets 11 which bring the teeth of the ratchet bars slightly below the upper face of the meat board to allow the levers to rest upon the rear end of the board, and their resiliency is sufficient to allow them to be readily sprung out of engagement with the ratchet bars and to cause them to readily swing back into such engagement.

The meat board is provided with a central longitudinal dove-tailed groove or way 12 in which is arranged a slide 13 which is T-shaped in cross-section, and which has its coincident flanges engaging the groove or way 12. The slide is provided at its rear end with a handle 14, and at its front end with an approximately U-shaped clip 15 having its sides formed into upwardly extending points 16 adapted to stick into the small end of a ham to prevent the latter twisting in the jaws and thereby become loose. The clip 15 is secured transversely of the slide and is prevented moving upward or laterally by the particular construction of the slide and groove, and it is adapted to be advanced along the meat board as the meat is sliced.

On the lower face of the meat board are secured transverse metal bars 17 which are extended beyond the outer edge of the meat board and provided with depending flanges 18 adapted to bear against the outer edge of a meat bench or the like to prevent the meat board moving inward on the bench; and the meat board is provided between the transverse bars 17 with a handle 18 by which the meat board is held.

When not in use the meat board together with the meat is hung on a nail or hook and an opening 19 is provided for this purpose and is arranged adjacent to the front transverse bar 17, whereby a hook or nail will bear against the latter to prevent wearing the wood of the board.

It will be seen that the meat clamp is exceedingly simple, strong and durable, that it is capable of securely holding a ham for cutting, and that it will permit a ready adjustment of the same, and will conform to the curved tapering sides of a ham.

Changes in the form, proportion, and the minor details of construction may be resorted to without departing from the principle or sacrificing any of the advantages of this invention.

What we claim is—

1. A meat clamp comprising a meat board, oppositely disposed levers fulcrumed intermediate of their ends on the board and provided at their front ends with clamping jaws, and means for securing the rear portions of the levers against movement, substantially as described.

2. A meat clamp comprising a meat board, oppositely disposed levers fulcrumed intermediate of their ends and provided at their front ends with vertically disposed jaws similarly curved and adapted to conform to the configuration of a ham, and means for securing the rear portions of the levers against movement, substantially as described.

3. A meat clamp comprising a meat board provided at its rear end with ratchet bars, and levers fulcrumed on the board intermediate of their ends and provided at their front ends with clamping jaws and having at their rear ends teeth engaging the ratchet bars, substantially as described.

4. A meat clamp comprising a meat-board provided at its rear end with similarly curved edges, curved ratchet bars secured to the curved edges, oppositely disposed levers fulcrumed on the meat board and provided at their front ends with clamping jaws and having their rear ends bent upward to form handles and provided with depending teeth to the ratchet bars, substantially as described.

5. A meat clamp comprising a meat board provided with a dove-tailed groove forming a way, oppositely disposed levers fulcrumed on the board and provided at their front ends with clamping jaws and having at their rear ends teeth, ratchet bars, and a slide T-shaped in cross-section fitting in said way and having at its rear end a handle and provided at its front end with upwardly extending points, substantially as described.

6. A meat clamp adapted to be placed on a bench at the outer edge thereof and having at its outer sides depending lugs to engage the bench and provided with a handle, substantially as described.

7. A meat clamp comprising a meat board provided on its upper face with plates 9, levers fulcrumed on the plates and provided at their front ends with clamping jaws, and at their rear ends with teeth, ratchet bars, and a fulcrum piece 10 arranged on each of said plates and forcing the front portion of each lever upward to cause the rear portion to be depressed to engage the ratchet bar, substantially as described.

In testimony that we claim the foregoing as our own we have hereto affixed our signatures in the presence of two witnesses.

AUGUSTUS G. KYLE.
EDWARD J. KYLE.

Witnesses:
J. B. DAVIDSON,
ROBT. S. RANDALL.